(12) United States Patent
Huang et al.

(10) Patent No.: US 11,237,418 B2
(45) Date of Patent: Feb. 1, 2022

(54) ELECTRONIC DEVICE AND MANUFACTURING METHOD THEREOF

(71) Applicant: InnoLux Corporation, Miao-Li County (TW)

(72) Inventors: Hsin-Hao Huang, Miao-Li County (TW); Chu-Hong Lai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/113,124

(22) Filed: Dec. 7, 2020

(65) Prior Publication Data

US 2021/0181563 A1 Jun. 17, 2021

(30) Foreign Application Priority Data

Dec. 13, 2019 (CN) .......................... 201911281339.2
Dec. 1, 2020 (CN) .......................... 202011387323.2

(51) Int. Cl.
*G02F 1/1333* (2006.01)
*G02F 1/1335* (2006.01)

(52) U.S. Cl.
CPC .. *G02F 1/133305* (2013.01); *G02F 1/133331* (2021.01); *G02F 1/133351* (2013.01); *G02F 1/133512* (2013.01)

(58) Field of Classification Search
CPC ......... G02F 1/133305; G02F 1/133351; G02F 1/133331; G02F 1/133512
See application file for complete search history.

(56) References Cited

U.S. PATENT DOCUMENTS

| | | | |
|---|---|---|---|
| 2017/0285394 A1* | 10/2017 | Cheng | G02F 1/133308 |
| 2018/0101036 A1* | 4/2018 | Wang | G02F 1/133512 |
| 2018/0101044 A1 | 4/2018 | Oka | |
| 2018/0196291 A1* | 7/2018 | Higano | G02F 1/1339 |
| 2019/0094583 A1* | 3/2019 | Moon | G02F 1/1339 |

* cited by examiner

*Primary Examiner* — Jessica M Merlin
(74) *Attorney, Agent, or Firm* — Winston Hsu

(57) ABSTRACT

An electronic device and a manufacturing method thereof are disclosed in the present disclosure. The electronic device comprises a first flexible substrate, a second flexible substrate and a sealing material. The first flexible substrate comprises a first laser-cutting buffer region, and the first flexible substrate comprises a first edge. The second flexible substrate comprises a second laser-cutting buffer region, and the second flexible substrate comprises a second edge. The sealing material is disposed between the first flexible substrate and the second flexible substrate. The sealing material is away from the first edge by the first laser-cutting buffer region and the sealing material is away from the second edge by the second laser-cutting buffer region. Therefore, the cracking of the sealing material can be reduced.

7 Claims, 9 Drawing Sheets

ELECTRONIC DEVICE AND MANUFACTURING METHOD THEREOF

CROSS REFERENCE TO RELATED APPLICATION

This application claims the benefit of Chinese Patent Application Serial No. 201911281339.2, filed Dec. 13, 2019, the entire content of which is incorporated herein by reference.

BACKGROUND OF THE DISCLOSURE

1. Field of the Disclosure

The present disclosure relates to an electronic device and a manufacturing method thereof, and more particularly to an electronic device with a flexible substrate served as a substrate and a manufacturing method thereof.

2. Description of the Prior Art

With the advancement of technology, display devices are gradually developed towards a trend of lightness and thinness. In the liquid crystal display device, the glass substrate can be replaced by a flexible substrate made of plastic to reduce the entire weight and the entire thickness (it can be called as a plastic liquid crystal display (PLCD)). In the current manufacturing method of the PLCD, a plurality of PLCDs would be manufactured at once, and then the PLCDs would be cut and separated. However, there are still some problems when cutting the PLCDs, for example, high temperature would be generated by laser cutting, and the sealant is prone to cracking when the cutting line is too close to the sealant, thereby causing leakage of liquid crystal.

SUMMARY OF THE DISCLOSURE

According to an embodiment of the present invention, an electronic device is disclosed. The electronic device comprises a first flexible substrate, a second flexible substrate and a sealing material. The first flexible substrate comprises a first laser-cutting buffer region, and the first flexible substrate comprises a first edge. The second flexible substrate comprises a second laser-cutting buffer region, and the second flexible substrate comprises a second edge. The sealing material is disposed between the first flexible substrate and the second flexible substrate. The sealing material is away from the first edge by the first laser-cutting buffer region and the sealing material is away from the second edge by the second laser-cutting buffer region.

According to another embodiment of the present invention, a manufacturing method of an electronic device is provided. First, a mother panel is provided, wherein the mother panel comprises a first flexible mother board, a second flexible mother board and at least one sealing material, and the sealing material is disposed between the first flexible mother board and the second flexible mother board. Then, a separated process is performed to cut the first flexible mother board into a first flexible substrate and to cut the second flexible mother board into a second flexible substrate, wherein the separating process comprises a laser-cutting process. The first flexible substrate comprises a first laser-cutting buffer region, and the first flexible substrate comprises a first edge. The second flexible substrate comprises a second laser-cutting buffer region, and the second flexible substrate comprises a second edge. The sealing material is away from the first edge by the first laser-cutting buffer region and the sealing material is away from the second edge by the second laser-cutting buffer region.

These and other objectives of the present disclosure will no doubt become obvious to those of ordinary skill in the art after reading the following detailed description of the embodiment that is illustrated in the various figures and drawings.

DETAILED DESCRIPTION

Figure 1:
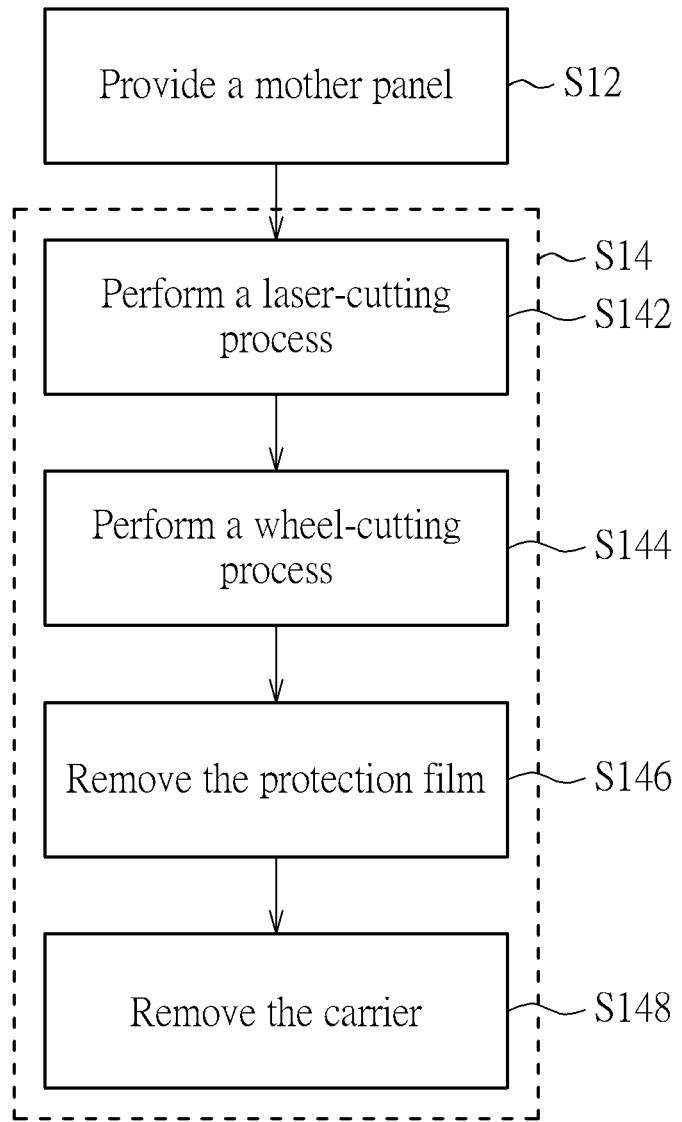
FIG. 1 schematically illustrates a flow chart of a manufacturing method of an electronic device according to an embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device or the tiled device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function. In the following description and in the claims, the terms "have" and "comprise" are used in an open-ended fashion, and thus should be interpreted to mean "include, but not limited to . . .".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

The terms "substantially", "equal to" or "the same" are generally interpreted as being within ±20% of the given value, or interpreted as being within ±10%, ±5%, ±3%, ±2%, ±1% or ±0.5% of the given value.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

The electronic device of the present disclosure may include a display device, an antenna device, a sensing device, a light emitting device or a tiled device, but not limited thereto. The electronic device may include a foldable electronic device or a flexible electronic device. The electronic device may for example include liquid crystal layer, fluorescence material, phosphors, light emitting diodes, other suitable display mediums or the combinations of the above-mentioned materials, but not limited thereto. The light emitting diode may for example include an organic light emitting diode (OLED), a mini light emitting diode (mini LED), a micro light emitting diode (micro LED), a quantum dot light emitting diode (QLED or QDLED), other suitable materials or the combinations of the above-mentioned materials, but not limited thereto. The display device is taken as an example of the electronic device to describe the contents of the present disclosure in the following, but the present disclosure is not limited thereto.

Figure 2:
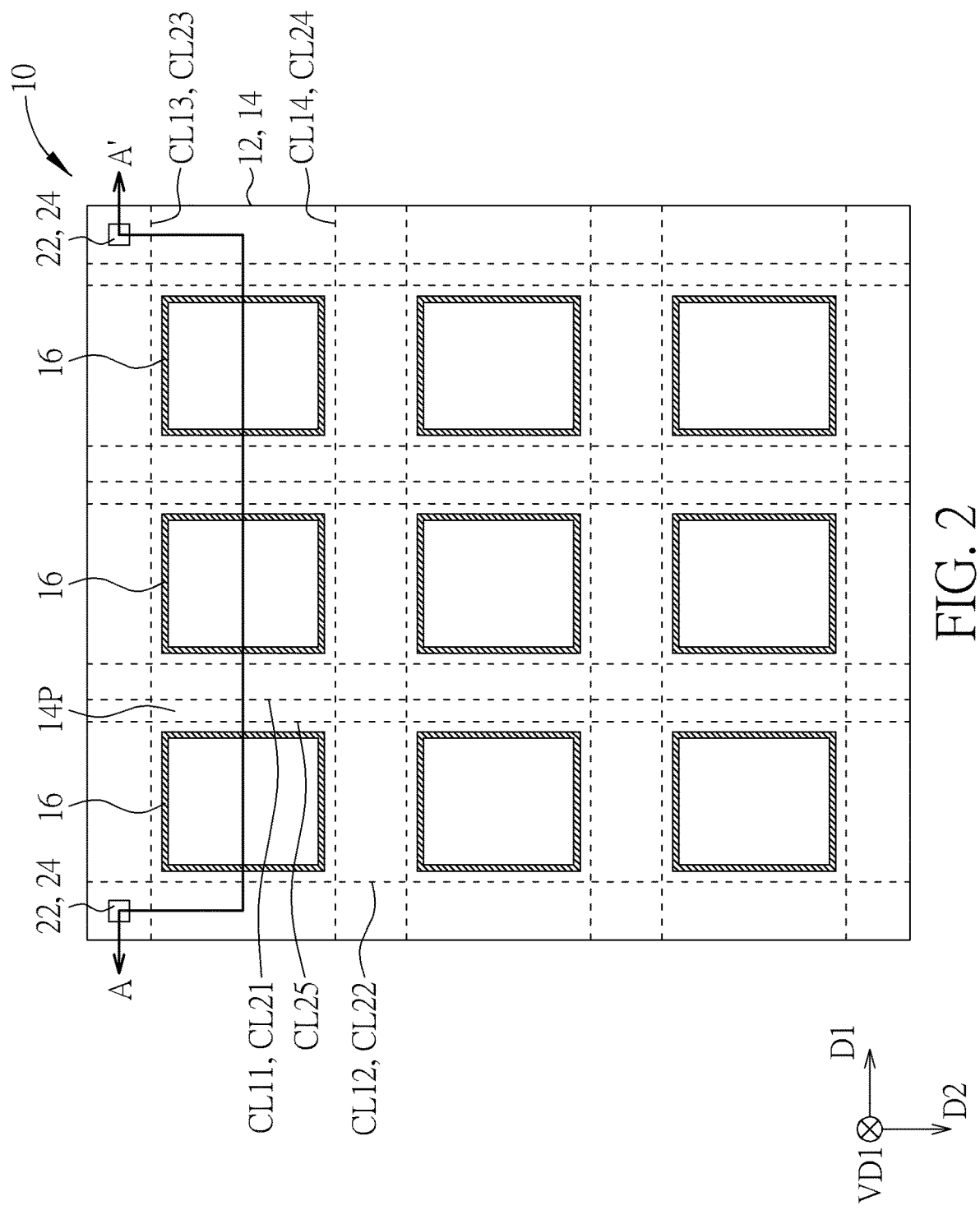
FIG. 2 schematically illustrates a structure in a step of a manufacturing method of an electronic device according to an embodiment of the present disclosure.
Figure 3:
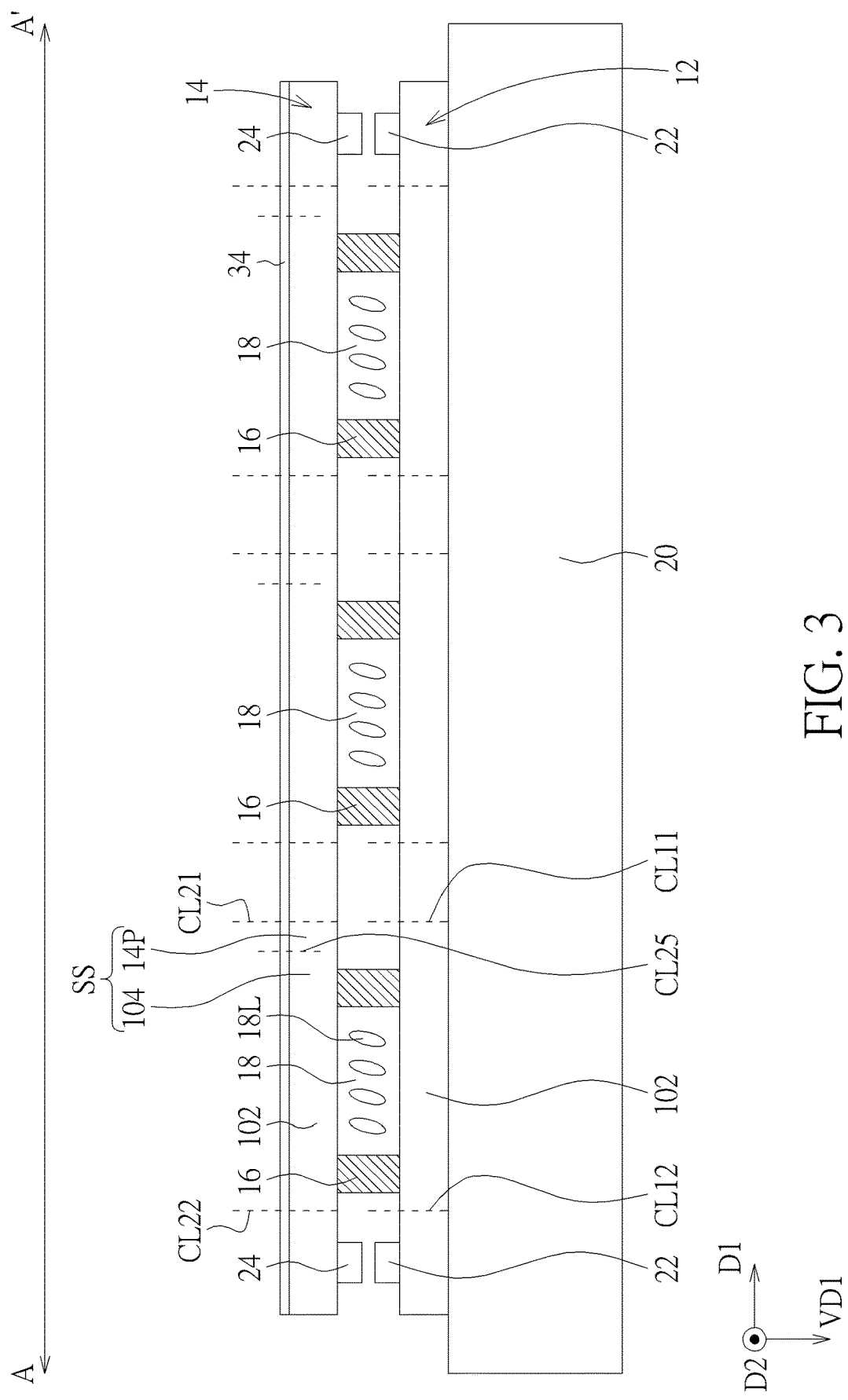
FIG. 3 schematically illustrates a cross-sectional view of FIG. 2 taken along a sectional line A-A'.
Figure 4:
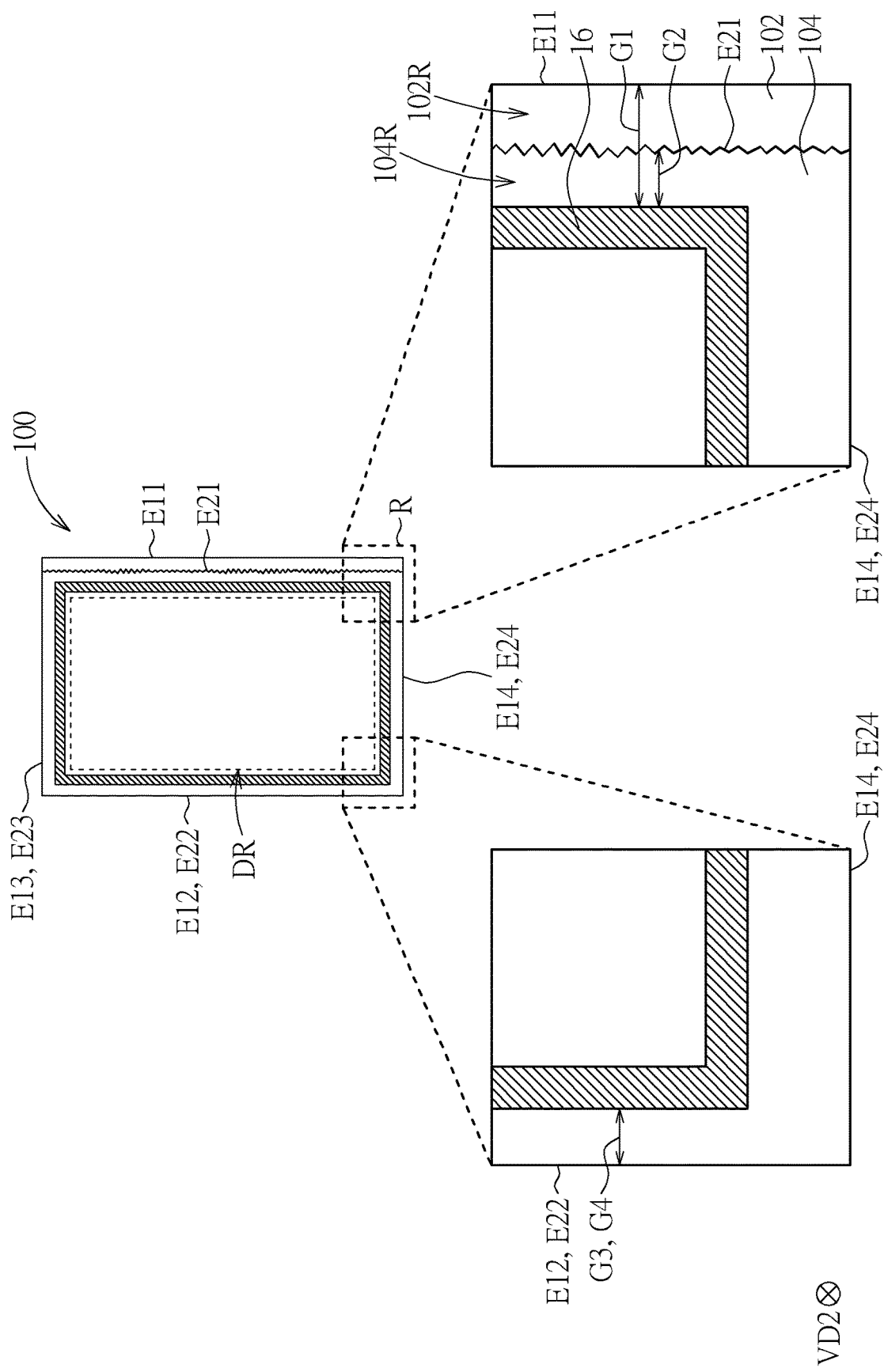
FIG. 4 schematically illustrates a top view of an electronic device according to a first embodiment of the present disclosure.
Figure 5:
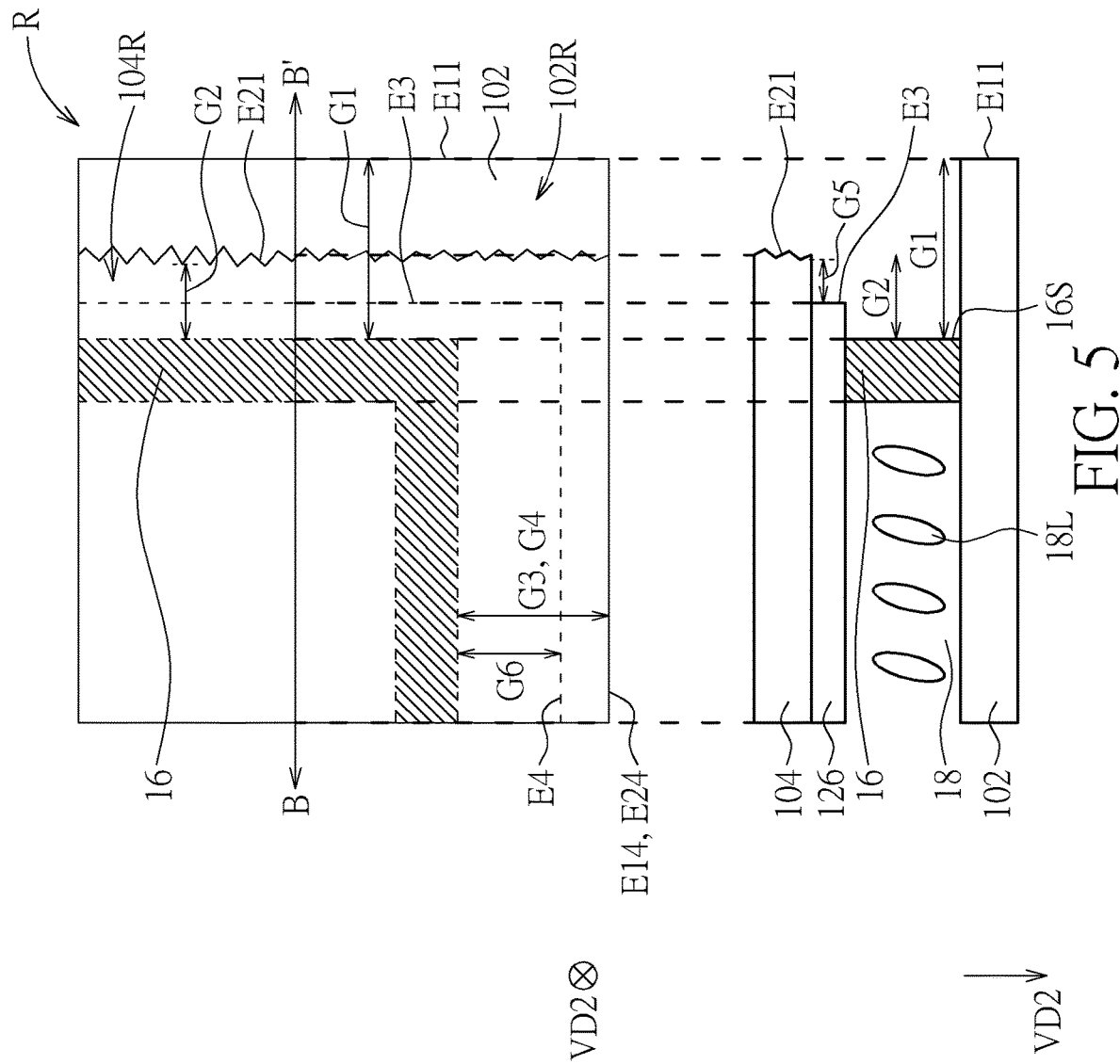
FIG. 5 schematically illustrates a partial enlarged top view and a partial enlarged cross-sectional view of an electronic device according to a first embodiment of the present disclosure.

FIG. 1 schematically illustrates a flow chart of a manufacturing method of an electronic device according to an embodiment of the present disclosure, FIG. 2 schematically illustrates a structure in a step of a manufacturing method of the electronic device according to an embodiment of the present disclosure, FIG. 3 schematically illustrates a cross-sectional view of FIG. 2 taken along a sectional line A-A', FIG. 4 schematically illustrates a top view of an electronic device according to a first embodiment of the present disclosure, and FIG. 5 schematically illustrates a partial enlarged top view and a partial enlarged cross-sectional view of an electronic device according to a first embodiment of the present disclosure, wherein an upper part of FIG. 5 shows an enlarged view of a region R shown in FIG. 4, and a lower part of FIG. 5 shows a cross-sectional view of the upper part taken along a sectional line B-B'. As shown in FIG. 1, a manufacturing method of the electronic device may include performing a step S12 and a step S14 in sequence. The detailed description below is further detailed in conjunction with FIG. 2 to FIG. 4. As shown in FIG. 1 to FIG. 3, the step S12 is performed at first to provide a mother panel 10. The mother panel 10 may include a first flexible mother board 12, a second flexible mother board 14 and at least one sealing material 16, and the sealing material 16 is disposed between the first flexible mother board 12 and the second flexible mother board 14 and used for bonding the first flexible mother board 12 to the second flexible mother board 14. The sealing material 16 may have a ring shape to seal one or more functional elements between the first flexible mother board 12 and the second flexible mother board 14. For example, the sealing material 16 may include a photocurable resin or other suitable materials. In some embodiments, the mother panel 10 may include a plurality of sealing materials 16 respectively surrounding the corresponding elements to reduce the manufacturing cost. A liquid crystal display device is taken as an example of the electronic device in the present embodiment, and the one or more functional elements may for example include a liquid crystal layer 18, but not limited thereto. Therefore, each of the sealing materials 16 may seal the corresponding liquid crystal layer 18 between the first flexible mother board 12 and the second flexible mother board 14.

In some embodiments, circuit elements such as thin film transistors, scan lines, data lines and pixel electrodes for controlling the rotation of liquid crystal molecules 18L of the liquid crystal layer 18 may be formed on a surface of one of the first flexible mother board 12 and the second flexible mother board 14 facing the other one of the first flexible mother board 12 and the second flexible mother board 14, but not limited thereto. In addition, light filtering elements such as color filter layer and black matrix layer may be optionally formed on the other one of the first flexible mother board 12 and the second flexible mother board 14 facing the one of the first flexible mother board 12 and the second flexible mother board 14, but not limited thereto. For clarity, the circuit elements and the light filtering elements formed on the first flexible mother board 12 and the second flexible mother board 14 are omitted in FIG. 2 and FIG. 3, but not limited thereto. According to the type or function of the electronic device, the types and configuration positions of the circuit elements and the light filtering elements may be adjusted accordingly, or, the electronic device may not include the light filtering elements, and is not limited to the embodiment shown in FIG. 3. In some embodiments, the electronic device may be a self-luminous display device such as an organic light emitting diode display device.

In some embodiments, the liquid crystal display device is taken as an example, and a forming method of the mother panel 10 may for example be described as follows. First, the first flexible mother board 12 with circuit elements formed thereon may be disposed on a carrier 20, and a plurality of sealing materials 16 may be formed on the first flexible motherboard 12. Then, the liquid crystal layer 18 is filled into the regions enclosed by the sealing materials 16, and the second flexible mother board 14 with light filtering elements formed thereon is disposed on the sealing materials 16 to bond the first flexible mother board 12 and the second flexible mother board 14 through the sealing materials 16, thereby forming the mother panel 10. In some embodiments, the step of bonding the first flexible mother board 12 and the second flexible mother board 14 can be achieved through aligning the alignment marks 22 on the first flexible mother board 12 with the alignment marks 24 on the second flexible mother board 14 in a horizontal direction. The horizontal direction may for example include the direction D1 and/or the direction D2. In some embodiments, the shapes and sizes of the alignment marks 22 and the alignment marks 24 may be the same as each other or different from each other. The forming methods of the sealing materials 16 and the liquid crystal layer 18 of the present disclosure are not limited to the above-mentioned methods.

In some embodiments, when the first flexible mother board 12 is disposed on the carrier 20 before the second flexible motherboard 14, the mother panel 10 may further include a protection film 34 disposed on the surface of the second flexible mother board 14 opposite to the first flexible mother board 12, such that the protection film 34 may be used to protect the display region (such as the region enclosed by the sealing material 16 observed in a top view direction VD1) of the electronic device in the subsequent cutting process so as to reduce particles attached to the display region or reduce the damage to the display region of the electronic device. In some embodiments, the material of the protection film 34 may for example include polyethylene (PE). The thickness of the protection film 34 may for example be greater than or equal to 20 micrometers (μm) and less than or equal to 40 μm, or may be 30 μm.

In some embodiments, the materials of the first flexible mother board 12 and the second flexible mother board 14 may respectively include polyimide (PI), polyethylene terephthalate (PET), polycarbonate (PC), polyethersulfone (PES), polybutylene terephthalate (PBT), polyethylene naphthalate (PEN), polyarylate (PAR), other suitable materials or combinations of the above-mentioned materials, but not limited thereto.

As shown in FIG. 1 to FIG. 5, the step S14 is performed after the step S12. That is, a separating process is performed to cut the first flexible mother board 12 into at least one first flexible substrate 102 and cut the second flexible mother board 14 into at least one second flexible substrate 104. In the present embodiment, the separating process in the step S14 may include a step S142 to a step S148. Specifically, as shown in FIG. 2 and FIG. 3, a laser-cutting process may be performed in the step S142 to form at least one first laser-cutting line CL11, at least one first laser-cutting line CL12, at least one first laser-cutting line CL13 and at least one first laser-cutting line CL14 in the first flexible motherboard 12 and form at least one second laser-cutting line CL21, at least one second laser-cutting line CL22, at least one second laser-cutting line CL23 and at least one second laser-cutting line CL24 in the second flexible mother board 14. In some embodiments, the first laser-cutting line CL11, the first laser-cutting line CL12, the first laser-cutting line CL13 and the first laser-cutting line CL14 may penetrate through the first flexible mother board 12 to separate a portion of the first flexible mother board 12 served as the first flexible substrate 102 from other portions of the first flexible mother board 12 to form the first flexible substrate 102. The second laser-cutting line CL21, the second laser-cutting line CL22, the second laser-cutting line CL23 and the second laser-cutting line CL24 may penetrate through the second flexible mother board 14 to separate a portion of the second flexible mother board 14 served as a semi-finished substrate SS from other portions of the second flexible mother board 14 to form the semi-finished substrate SS. In the present embodiment, when the first flexible mother board 12 is disposed on the carrier 20 before the second flexible mother board 14, the step S14 may further include forming at least one laser pre-cutting line CL25 in the second flexible mother board 14. The laser pre-cutting line CL25 may divide the semi-finished substrate SS into the second flexible substrate 104 and a portion 14P of the semi-finished substrate SS located between the second laser-cutting line CL21 and the laser pre-cutting line CL25. For example, the portion 14P of the second flexible mother board 14 overlaps a first laser-cutting buffer region (such as the first laser-cutting buffer region 102R shown in FIG. 4 and FIG. 5) and located outside a second laser-cutting buffer region (such as the second laser-cutting buffer region 104R shown in FIG. 4 and FIG. 5) in the top view direction VD of the mother panel 10. In some embodiments, the laser pre-cutting line CL25 may not penetrate through the second flexible mother board 14 to reduce or avoid damage to a portion of the circuit elements corresponding to the laser pre-cutting line CL25 in the top view direction VD. Therefore, the portion 14P between the second laser-cutting line CL21 and the laser pre-cutting line CL25 is not separated from the portion of the second flexible mother board 14 served as the second flexible substrate 104. In some embodiments, the laser pre-cutting line CL25 may be formed before or after the formation of the first laser-cutting line CL11, the first laser-cutting line CL12, the first laser-cutting line CL13, the first laser-cutting line CL14, the second laser-cutting line CL21, the second laser-cutting line CL22, the second laser-cutting line CL23 and the second laser-cutting line CL24, or may be formed between the formation of any two of the first laser-cutting line CL11, the first laser-cutting line CL12, the first laser-cutting line CL13, the first laser-cutting line CL14, the second laser-cutting line CL21, the second laser-cutting line CL22, the second laser-cutting line CL23 and the second laser-cutting line CL24.

In the present embodiment, the portion of the first flexible mother board 12 enclosed by the first laser-cutting line CL11, the first laser-cutting line CL12, the first laser-cutting line CL13 and the first laser-cutting line CL14 may forma first flexible substrate 102, the portion of the second flexible mother board 14 enclosed by the second laser-cutting line CL22, the second laser-cutting line CL23, the second laser-cutting line CL24 and the laser pre-cutting line CL25 may form a second flexible substrate 104, and the sealing material 16 may be disposed in the region enclosed by the first laser-cutting line CL11, the first laser-cutting line CL12, the first laser-cutting line CL13 and the first laser-cutting line CL14 and in the region enclosed by the second laser-cutting line CL22, the second laser-cutting line CL23, the second laser-cutting line CL24 and the laser pre-cutting line CL25. Therefore, an electronic device can be defined by the first laser-cutting line CL11, the first laser-cutting line CL12, the first laser-cutting line CL13, the first laser-cutting line CL14, the second laser-cutting line CL22, the second laser-cutting line CL23, the second laser-cutting line CL24 and the laser pre-cutting line CL25. The region enclosed by the first laser-cutting line CL11, the first laser-cutting line CL12, the first laser-cutting line CL13 and the first laser-cutting line CL14 and the region enclosed by the second laser-cutting line CL22, the second laser-cutting line CL23, the second laser-cutting line CL24 and the laser pre-cutting line CL25 are not limited to the above-mentioned contents in the present disclosure. In the present embodiment, the numbers of the first laser-cutting line CL11, the first laser-cutting line CL12, the first laser-cutting line CL13 and the first laser-cutting line CL14 may respectively be plural, and the numbers of the second laser-cutting line CL21, the second laser-cutting line CL22, the second laser-cutting line CL23, the second laser-cutting line CL24 and the laser pre-cutting line CL25 may respectively be plural to cut out a plurality of electronic devices, but not limited thereto. The numbers of the first laser-cutting line CL11, the first laser-cutting line CL12, the first laser-cutting line CL13, the first laser-cutting line CL14, the second laser-cutting line CL21, the second laser-cutting line CL22, the second laser-cutting line CL23, the second laser-cutting line CL24 and the laser pre-cutting line CL25 may be determined according to the number of the electronic devices to be formed in the present disclosure.

In the embodiment shown in FIG. 2, the first laser-cutting line CL11 and the second laser-cutting line CL21 may be substantially aligned in the top view direction VD1 of the mother panel 10, the first laser-cutting line CL12 and the second laser-cutting line CL22 may be substantially aligned in the top view direction VD1 of the mother panel 10, the first laser-cutting line CL13 and the second laser-cutting line CL23 may be substantially aligned in the top view direction VD1 of the mother panel 10, and the first laser-cutting line CL14 and the second laser-cutting line CL24 may be substantially aligned in the top view direction VD1 of the mother panel 10. Therefore, in FIG. 2, the first laser-cutting line CL11, the first laser-cutting line CL12, the first laser-cutting line CL13 and the first laser-cutting line CL14 refer to the lines respectively the same as the second laser-cutting line CL21, the second laser-cutting line CL22, the second laser-cutting line CL23 and the second laser-cutting line CL24, such that the first laser-cutting line CL11 and the second laser-cutting line CL21 aligned with each other may be formed at once from top to bottom (for example, from the upper surface of the second flexible mother board 14 to the lower surface of the first flexible mother board 12) in the same laser cutting, the first laser-cutting line CL12 and the second laser-cutting line CL22 aligned with each other may be formed at once from top to bottom in the same laser cutting, the first laser-cutting line CL13 and the second laser-cutting line CL23 aligned with each other may be formed at once from top to bottom in the same laser cutting, and the first laser-cutting line CL14 and the second laser-cutting line CL24 aligned with each other may be formed at once from top to bottom in the same laser cutting, but the present disclosure is not limited thereto. In some embodiments, in at least one pair of the first laser-cutting line CL11 and the corresponding second laser-cutting line CL21, the first laser-cutting line CL12 and the corresponding second laser-cutting line CL22, the first laser-cutting line CL13 and the corresponding second laser-cutting line CL23, and the first laser-cutting line CL14 and the corresponding second laser-cutting line CL24, the first laser-cutting line and the second laser-cutting line may not be aligned with each other in the top view direction VD1. Therefore, in at least one pair of the first laser-cutting line CL11 and the corresponding second laser-cutting line CL21, the first laser-cutting line CL12 and the corresponding second laser-cutting line CL22, the first laser-cutting line CL13 and the corresponding second laser-cutting line CL23, and the first laser-cutting line CL14 and the corresponding second laser-cutting line CL24, the first laser-cutting line and the second laser-cutting line may respectively be formed in different laser cuttings.

It should be noted that in order to reduce the cracking of the sealing material 16 due to high temperature generated by the laser in the laser-cutting process, each of the laser-cutting lines and the sealing material 16 or the laser pre-cutting line CL25 and the sealing material 16 may have a certain distance (that is, a minimum distance between one of the laser-cutting lines and the sealing material 16 or between the laser pre-cutting line CL25 and the sealing material 16 observed in the top view direction VD1), such that the laser-cutting lines or the laser pre-cutting line CL25 may be spaced apart from the sealing material 16. The minimum distance may for example be greater than or equal to 200 micrometers (μm). Or, the minimum distance may range from 300 μm to 450 μm. Or, the minimum distance may range from 300 μm to 400 μm or range from 400 μm to 450 μm.

In some embodiments, the black matrix layer (not shown) formed on the second flexible mother board 14 may include openings (not shown) overlapping the laser-cutting lines in the top view direction VD1, which is helpful for machine alignment during the laser-cutting process.

In some embodiments, the step S14 may optionally include a wheel-cutting process (step S144) after the laser-cutting process (step S142), such that the wheel-cutting process may be performed on the carrier 20 along the first laser-cutting line CL11 and the second laser-cutting line CL21 aligned with each other, the first laser-cutting line CL12 and the second laser-cutting line CL22 aligned with each other, the first laser-cutting line CL13 and the second laser-cutting line CL23 aligned with each other and the first laser-cutting line CL14 and the second laser-cutting line CL24 aligned with each other.

As shown in FIG. 1, FIG. 4 and FIG. 5, the step S146 is performed after the wheel-cutting process to remove the protection film 34 and remove the portion 14P of the semi-finished substrate SS along the laser pre-cutting line CL25 to separate the portion 14P from the second flexible substrate 104. The removal method may for example be tearing. Because the protection film 34 may be adhered to the portion 14P, the portion 14P may be torn from the second flexible substrate 104 in the step of tearing the protection film 34. After that, the step S148 may be performed to remove the carrier 20, thereby forming the electronic device 100 of the present embodiment. The carrier 20 may for example include glass or other suitable materials. In some embodiments, the removal of the carrier 20 may for example be achieved by comprehensively irradiating the interface between the carrier 20 and the first flexible substrate 102 with laser light from a side of the carrier 20 opposite to the first flexible mother board 12 to reduce the adhesion between the carrier 20 and the first flexible substrate 102, thereby separating the first flexible substrate 102 from the carrier 20. It should be noted that the energy of the laser light of the laser-cutting process may for example be one thousand or thousands of times the energy of the laser light used to separate the carrier 20 and the first flexible substrate 102. In some embodiments, a polarizer may be adhered to a side of the second flexible substrate 104 opposite to the first flexible mother board (such as the side on which the protection film 34 is originally disposed) between the step S146 of removing the protection film 34 and the portion 14P of the semi-finished substrate SS (as shown in FIG. 2 and FIG. 3) and the step S148 of removing the carrier 20. In some embodiments, another polarizer may be adhered to a side of the first flexible substrate 102 opposite to the second flexible substrate 104 (such as the side on which the carrier 20 is originally disposed) after the step S148 of removing the carrier 20.

Figure 6:
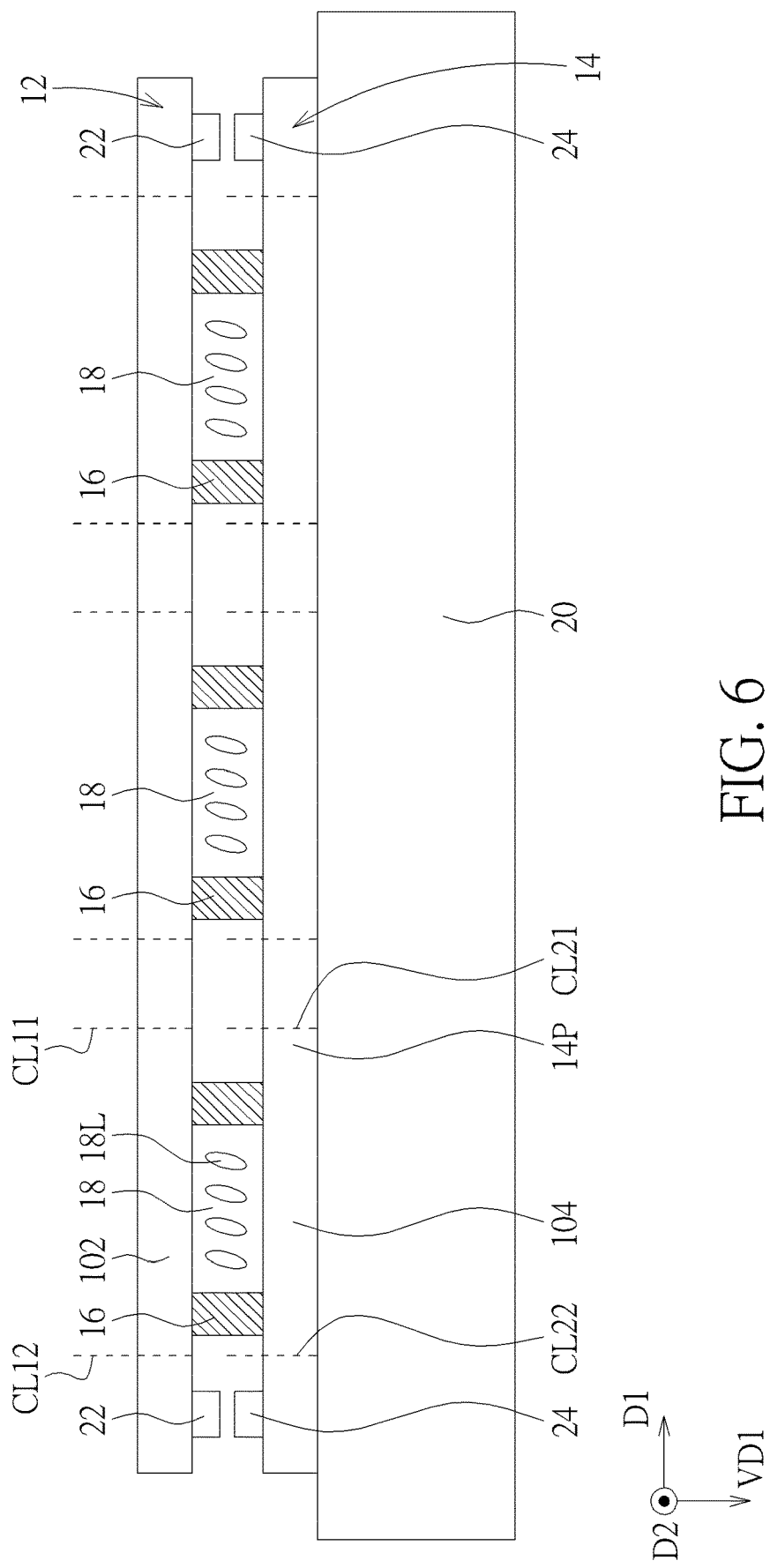
FIG. 6 schematically illustrates a manufacturing method of an electronic device according to some embodiments of the present disclosure.

Referring to FIG. 6, FIG. 6 schematically illustrates a manufacturing method of an electronic device according to some embodiments of the present disclosure. In some embodiments, the order of disposing the first flexible mother board 12 and disposing the second flexible mother board 14 may be exchanged. That is, the second flexible mother board 14 may be disposed on the carrier 20 at first and followed by forming the sealing materials 16 on the second flexible mother board 14, filling the liquid crystal layer 18 and then bonding the first flexible mother board 12 to the second flexible mother board 14. In such situation, the laser pre-cutting line CL25 may not be formed in the second flexible mother board 14 in the step S142, and the step S146 of removing the portion 14P of the semi-finished substrate SS may be performed after the step S148 of removing the carrier 20. Therefore, the electronic device 100 may be formed after removing the portion 14P. The portion 14P may for example be torn manually. In some embodiments, a polarizer may be adhered to a side of the first flexible substrate 102 opposite to the second flexible substrate 104 between the step S146 and the step S148, and another polarizer may be adhered to a side of the second flexible substrate 104 opposite to the first flexible substrate 102 after the step S148 of removing the carrier 20, but not limited thereto.

As shown in FIG. 2 and FIG. 4, the first flexible substrate 102 formed through the above-mentioned method may include four edges E11, E12, E13 and E14 respectively formed through the first laser-cutting line CL11, the first laser-cutting line CL12, the first laser-cutting line CL13 and the first laser-cutting line CL14, and the second flexible substrate 104 may include four edges E21, E22, E23 and E24 respectively formed through the laser pre-cutting line CL25, the second laser-cutting line CL22, the second laser-cutting line CL23 and the second laser-cutting line CL24. Therefore, the edge E21, the edge E22, the edge E23 and the edge E24 may respectively correspond to the edge E11, the edge E12, the edge E13 and the edge E14. Because the edge E12 is substantially aligned with the edge E22, the edge E13 is substantially aligned with the edge E23, and the edge E14 is substantially aligned with the edge E24 in a top view direction VD2 of the electronic device 100, the edge E22, the edge E23 and the edge E24 shown in FIG. 4 respectively refer to lines the same as the edge E12, the edge E13 and the edge E14, but the present disclosure is not limited thereto. The shape of the electronic device 100 may be a rectangle in the present embodiment, but the shape of the electronic device 100 of the present disclosure is not limited thereto. In some embodiments, the shape of the electronic device may be a circle or other geometric shapes.

In some embodiments, because the edge E11, the edge E12, the edge E13 and the edge E14 of the first flexible substrate 102 and the edge E22, the edge E23 and the edge E24 of the second flexible substrate 104 are formed by laser cutting, the surface may be relatively flat. Because the edge E21 of the second flexible substrate 104 corresponding to the laser pre-cutting line CL25 is formed through tearing, the edge E21 may be an uneven surface. The roughness of the edge E21 may be greater than the roughnesses of the edge E22, the edge E23 and the edge E24 of the second flexible substrate 104 formed by laser cutting. In addition, the roughness of the edge E21 of the second flexible substrate 104 may be greater than the roughnesses of the edge E11, the edge E12, the edge E13 and the edge E14 of the first flexible substrate 102 formed by laser cutting.

As shown in FIG. 4 and FIG. 5, in the electronic device 100 of the present embodiment, the first flexible substrate 102 may include the first laser-cutting buffer region 102R, and the sealing material 16 is away from the edge E11, the edge E12, the edge E13 and the edge E14 by the first laser-cutting buffer region 102R; the second flexible substrate 104 may include the second laser-cutting buffer region 104R, and the sealing material 16 is away from the edge E21, the edge E22, the edge E23 and the edge E24 by the second laser-cutting buffer region 104R. The first laser-cutting buffer region 102R may be defined as a region extending from the edge E11, the edge E12, the edge E13, and the edge E14 of the first flexible substrate 102 to the outer sides 16S of the sealing material 16 along directions away from the edge E11, the edge E12, the edge E13, and the edge E14 of the first flexible substrate 102 toward the inner side of the sealing material 16. Similarly, the second laser-cutting buffer region 104R may be defined as a region extending from the edge E21, the edge E22, the edge E23, and the edge E24 to the outer sides 16S of the sealing material 16 along directions away from the edge E21, the edge E22, the edge E23, and the edge E24 of the second flexible substrate 104 toward the inner side of the sealing material 16. For example, the display region DR of the electronic device 100 may be located at the inner side of the sealing material 16.

It should be noted that through the design of the first laser-cutting buffer region 102R and the second laser-cutting buffer region 104R, the effect of high temperature generated by the laser on the sealing material 16 may be reduced, thereby reducing the cracking of the sealing material 16. In the embodiment where the liquid crystal display device is taken as an example, the liquid crystal layer 18 is disposed and sealed between the first flexible substrate 102 and the second flexible substrate 104. Through the design of the first laser-cutting buffer region 102R and the second laser-cutting buffer region 104R, the leakage of liquid crystal molecules 18L of the liquid crystal layer 18 may be reduced to improve the production yield of the electronic device 100. For example, a width of the first laser-cutting buffer region 102R and a width of the second laser-cutting buffer region 104R may both be greater than or equal to 200 µm, wherein the widths mentioned above is the minimum width between the edges of the substrate and the sealing material.

In some embodiments, in the cross-sectional view shown in the lower part of FIG. 5, a minimum distance G1 (such as the minimum width of the first laser-cutting buffer region 102R from the edge E11 to the sealing material 16) may be included between the projection of the edge E11 of the first flexible substrate 102 and the projection of the sealing material 16 on a plane perpendicular to the top view direction VD2 of the electronic device 100. In the cross-sectional view shown in the lower part of FIG. 5, a minimum distance G2 (such as the minimum width of the second laser-cutting buffer region 104R from the edge E21 to the sealing material 16) may be included between the projection of the edge E21 of the second flexible substrate 104 and the projection of the sealing material 16 on the plane perpendicular to the top view direction VD2 of the electronic device 100. The minimum distance G1 may be greater than the minimum distance G2. In some embodiments, the minimum distance G2 can also be obtained by measuring the minimum distances between five points of the uneven edge E21 and the sealing material 16 and taking the average value of the minimum distances.

As shown in FIG. 4, minimum distances G3 (that is, the widths of the first laser-cutting buffer region 102R respectively from the edge E12, the edge E13 and the edge E14 to the sealing material 16) may respectively be included between the edge E12, the edge E13 and the edge E14 of the first flexible substrate 102 and the sealing material 16. The minimum distance G3 between the edge E12 and the sealing material 16, the minimum distance G3 between the edge E13 and the sealing material 16, and the minimum distance G3 between the edge E14 and the sealing material 16 may be the same as each other, or at least two of the minimum distances G3 may be different. Minimum distances G4 (that is, the widths of the second laser-cutting buffer region 104R respectively from the edge E22, the edge E23 and the edge E24 to the sealing material 16) may respectively be included between the edge E22, the edge E23 and the edge E24 of the second flexible substrate 104 and the sealing material 16. The minimum distances G4 between the edge E22 and the sealing material 16, the minimum distance G4 between the edge E23 and the sealing material 16, and the minimum distance G4 between the edge E24 and the sealing material 16 may be the same as each other, or at least two of the minimum distances G4 may be different. In some embodiments, the minimum distance G3 and the minimum distance G4 may be different from the minimum distance G1 and the minimum distance G2, or the minimum distance G3 and the minimum distance G4 may be the same as one of the minimum distance G1 and the minimum distance G2. In the embodiment shown in FIG. 4, the minimum distance G3 may substantially be the same as the minimum distance G4, but not limited thereto. For example, the minimum distance G1, the minimum distance G2, the minimum distance G3 and the minimum distance G4 may range from 300 μm to 450 μm. Or, the minimum distance G1, the minimum distance G2, the minimum distance G3 and the minimum distance G4 may range from 300 μm to 400 μm or range from 400 μm to 450 μm according to the demands.

In some embodiments, the electronic device 100 may further include a black matrix layer 126 disposed on the second flexible substrate 104. The black matrix layer 126 may be used to define the regions of sub-pixels or pixels of the display device. For example, the black matrix layer 126 may be disposed on a surface of the second flexible substrate 104 facing the first flexible substrate 102, but not limited thereto. In some embodiments, a portion of the first laser-cutting buffer region 102R is not covered by the black matrix layer 126 in the top view direction VD2 of the electronic device 100. For example, the black matrix layer 126 and the sealing material 16 may be overlapped in the top view direction VD2 and extend from the inner side of the sealing material 16 to the outer side of the sealing material 16, and the black matrix layer 126 and a portion of the first laser-cutting buffer region 102R are not overlapped, but the present disclosure is not limited thereto. In some embodiments, a minimum distance G5 may be included between the edge E3 of the black matrix layer 126 adjacent to the edge E21 of the second flexible substrate 104 and the edge E21, and the minimum distance G5 is less than or equal to the minimum distance G2 corresponding to the edge E21 of the second flexible substrate 104. In some embodiments, minimum distances (such as the minimum distance G6) which are less than or equal to the minimum distance G4 may be included between other edges (such as the edge E4) of the black matrix layer 126 and the corresponding edges (such as the edge E24) of the second flexible substrate 104.

The electronic device of the present disclosure is not limited to the above-mentioned embodiments, and the present disclosure may include different embodiments. In order to simplify the description, the element in different embodiments in the following would be labeled with the same symbol of the same element in the first embodiment. In order to compare the differences between the first embodiment and different embodiments easily, the differences in other embodiments will be described in detail in the following, and the same features will not be redundantly described.

Figure 7:
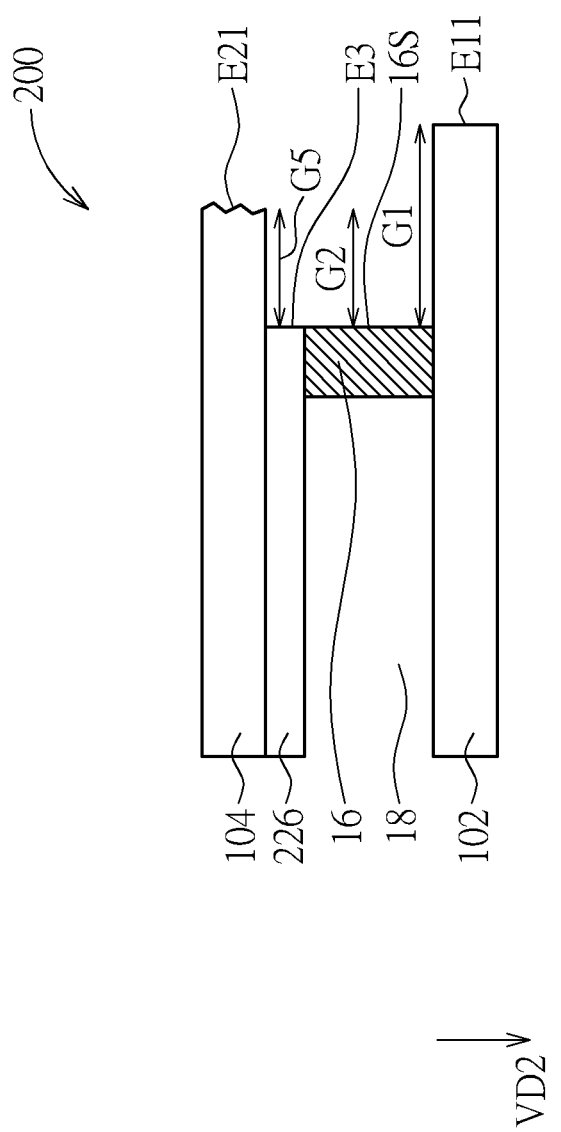
FIG. 7 schematically illustrates a cross-sectional view of an electronic device according to a second embodiment of the present disclosure.

FIG. 7 schematically illustrates a cross-sectional view of an electronic device according to a second embodiment of the present disclosure. The difference between the electronic device 200 of the present embodiment and the electronic device of the above-mentioned embodiment is that the edge E3 of the black matrix layer 226 adjacent to the edge E21 of the second flexible substrate 104 may substantially be aligned with the outer side 16S of the sealing material 16 in the present embodiment, so the minimum distance G5 between the edge E3 of the black matrix layer 226 and the edge E21 of the second flexible substrate 104 may substantially be the same as the minimum distance G2 between the sealing material 16 and the edge E21 of the second flexible substrate 104. In some embodiments, the sealing material 16 and the black matrix layer 226 may not be overlapped in the top view direction VD2 of the electronic device 200.

Figure 8:
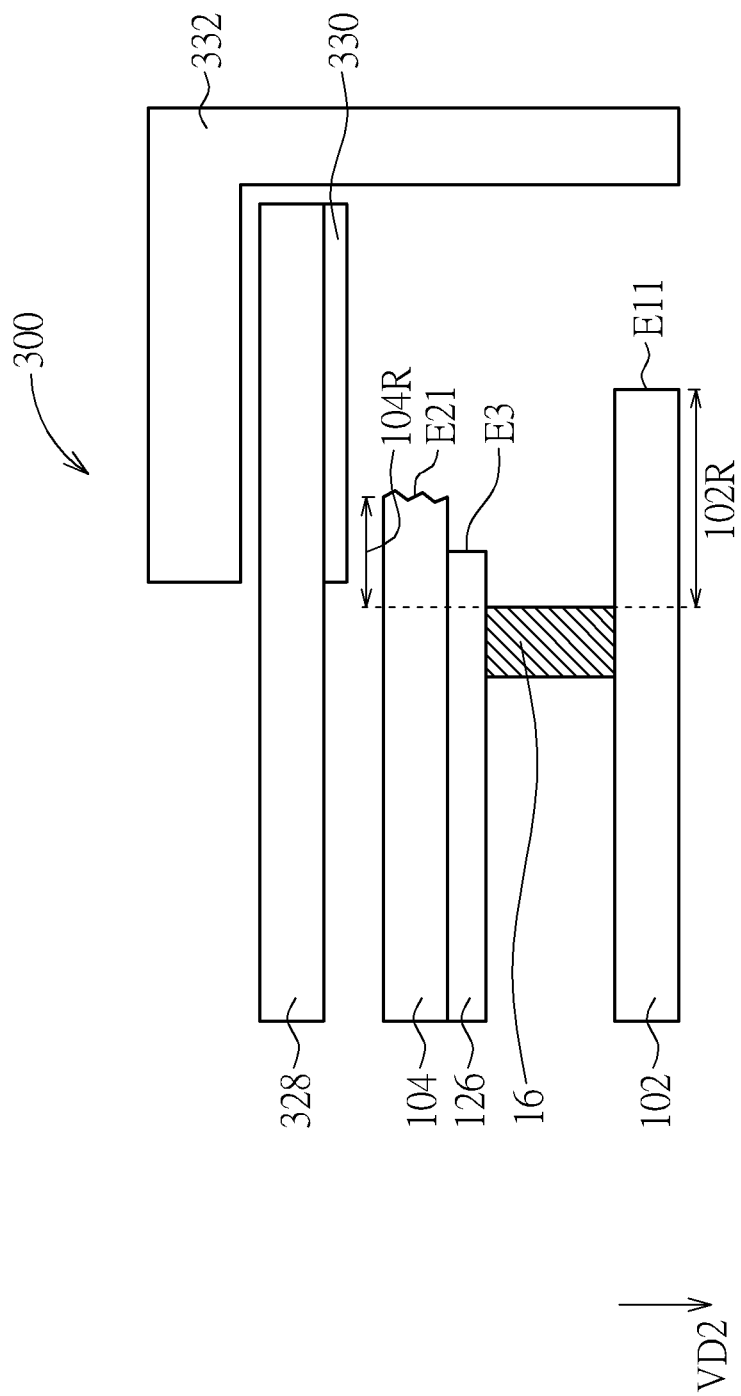
FIG. 8 schematically illustrates a cross-sectional view of an electronic device according to a third embodiment of the present disclosure.

FIG. 8 schematically illustrates a cross-sectional view of an electronic device according to a third embodiment of the present disclosure. The difference between the electronic device 300 of the present embodiment and the electronic device of the above-mentioned embodiments is that the electronic device 300 of the present embodiment may further include a cover layer 328 and a light blocking layer 330 disposed on the cover layer 328, wherein the light blocking layer 330 overlaps the first laser-cutting buffer region 102R and the black matrix layer 126 in the top view direction VD2 of the electronic device 300. For example, the light blocking layer 330 may cover a portion of the first flexible substrate 102 from the edge E11 to the edge E3 in the top view direction VD2 to reduce the light generated by the electronic device 300 and emitted from the portion of the second flexible substrate 104 without overlapping the black matrix layer 126 in the top view direction VD2, such that light leakage may be reduced. In some embodiments, the light blocking layer 330 may cover the portion of the first flexible substrate 102 from other edges (such as the edge E12, the edge E13 and the edge E14 shown in FIG. 4) of the first flexible substrate 102 to the corresponding edges of the black matrix layer 126 in the top view direction VD2. In some embodiments, the light blocking layer 330 may include ink, photoresist materials or other suitable light blocking materials, but not limited thereto.

In some embodiments, the electronic device 300 may further include a frame 332, and the frame 332 may overlap the first laser-cutting buffer region 102R and the black matrix layer 126 in the top view direction VD2 of the electronic device 300, thereby reducing light leakage. For example, the light leakage may be reduced through covering the portion of the first flexible substrate 102 from the edge E11 to the edge E3 in the top view direction VD2 by the frame 332. In some embodiments, the frame 332 may also cover the portions of the first flexible substrate 102 from other edges (such as the edge E12, the edge E13 and the edge E14 shown in FIG. 4) of the first flexible substrate 102 to the corresponding edges of the black matrix layer 126 in the top view direction VD2. In some embodiments, the frame 332 may include metals or other suitable materials, but not limited thereto. In some embodiments, one of the light blocking layer 330 and the frame 332 may overlap the first laser-cutting buffer region 102R and the black matrix layer 126. In some embodiments, the electronic device 300 may also include one of the combination of the cover layer 328 and the light blocking layer 330 and the frame 332.

Figure 9:
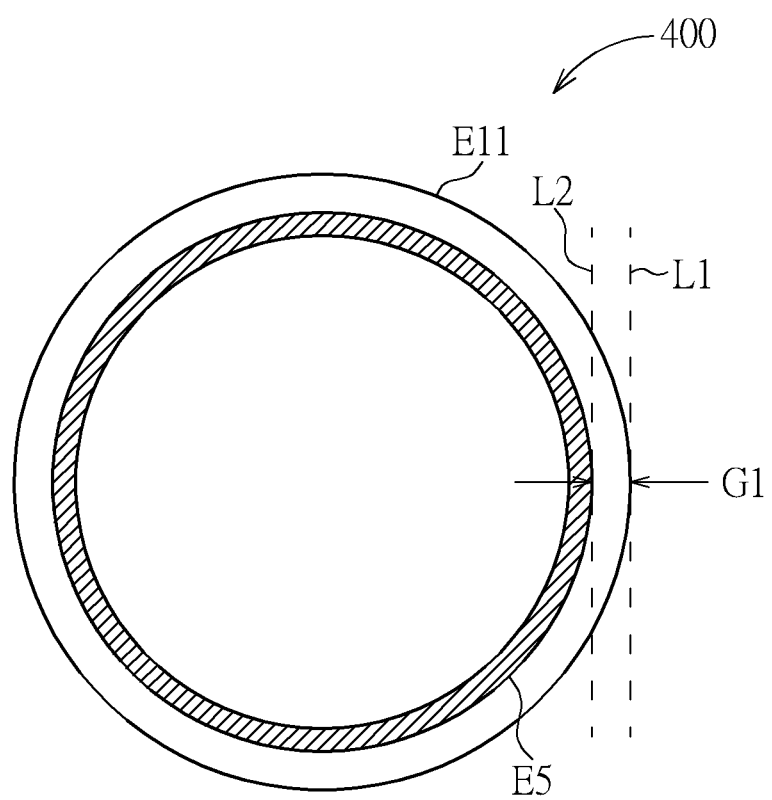
FIG. 9 schematically illustrates a top view of an electronic device according to a fourth embodiment of the present disclosure.

FIG. 9 schematically illustrates a top view of an electronic device according to a fourth embodiment of the present disclosure. The difference between the electronic device 400 of the present embodiment and the electronic device of the above-mentioned embodiments is that the shape of top view of the electronic device 400 of the present embodiment may be non-rectangular. For example, the first flexible substrate 402 and the second flexible substrate of the electronic device 400 may be a circle or other geometric shapes. For clarity, the second flexible substrate is omitted in FIG. 9. In the non-rectangular electronic device 400, the minimum distance G1 between the sealing material 16 and the first flexible substrate 402 may be defined as the minimum distance between the edge E11 of the first flexible substrate 402 and the edge E5 of the sealing material 16 in a direction perpendicular to an extending direction of a tangent line L1 of the edge E11 of the first flexible substrate 402. For example, the minimum distance G1 may be the distance between the tangent line L1 of the edge E11 of the first flexible substrate 402 and a tangent line L2 passing though the edge E5 of the sealing material 16 and parallel to the tangent line L1.

In summary, in the electronic device and the manufacturing method thereof of the present disclosure, the effect of high temperature generated by the laser on the sealing material may be reduced through the first laser-cutting buffer region and the second laser-cutting buffer region, thereby reducing the cracking of the sealing material.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a first flexible substrate having a first laser-cutting buffer region, comprising a first edge;
a second flexible substrate having a second laser-cutting buffer region, comprising a second edge and a third edge; and
a sealing material disposed between the first flexible substrate and the second flexible substrate;
wherein the sealing material is away from the first edge by the first laser-cutting buffer region and the sealing material is away from the second edge by the second laser-cutting buffer region, and
wherein the first edge and the second edge are disposed on a same side of the sealant material in a top view direction of the electronic device, a minimum distance between the first edge and the sealing material is greater than a minimum distance between the second edge and the sealing material, and a roughness of the second edge is greater than a roughness of the third edge.

2. The electronic device according to claim 1, wherein a width of the first laser-cutting buffer region and a width of the second laser-cutting buffer region are both greater than or equal to 200 μm.

3. The electronic device according to claim 1, further comprising a black matrix layer disposed on the second flexible substrate, wherein a portion of the first laser-cutting buffer region is not covered by the black matrix layer in the top view direction of the electronic device.

4. The electronic device according to claim 3, further comprising a covering layer and a light blocking layer disposed thereon, wherein the light blocking layer overlaps the first laser-cutting buffer region and the black matrix layer in the top view direction of the electronic device.

5. The electronic device according to claim 3, further comprising a frame overlapping the first laser-cutting buffer region and the black matrix layer in the top view direction of the electronic device.

6. The electronic device according to claim 1, further comprising a liquid crystal layer disposed between the first flexible substrate and the second flexible substrate.

7. The electronic device according to claim 1, wherein the roughness of the second edge is greater than a roughness of the first edge.

* * * * *